United States Patent Office 3,010,240
Patented Nov. 28, 1961

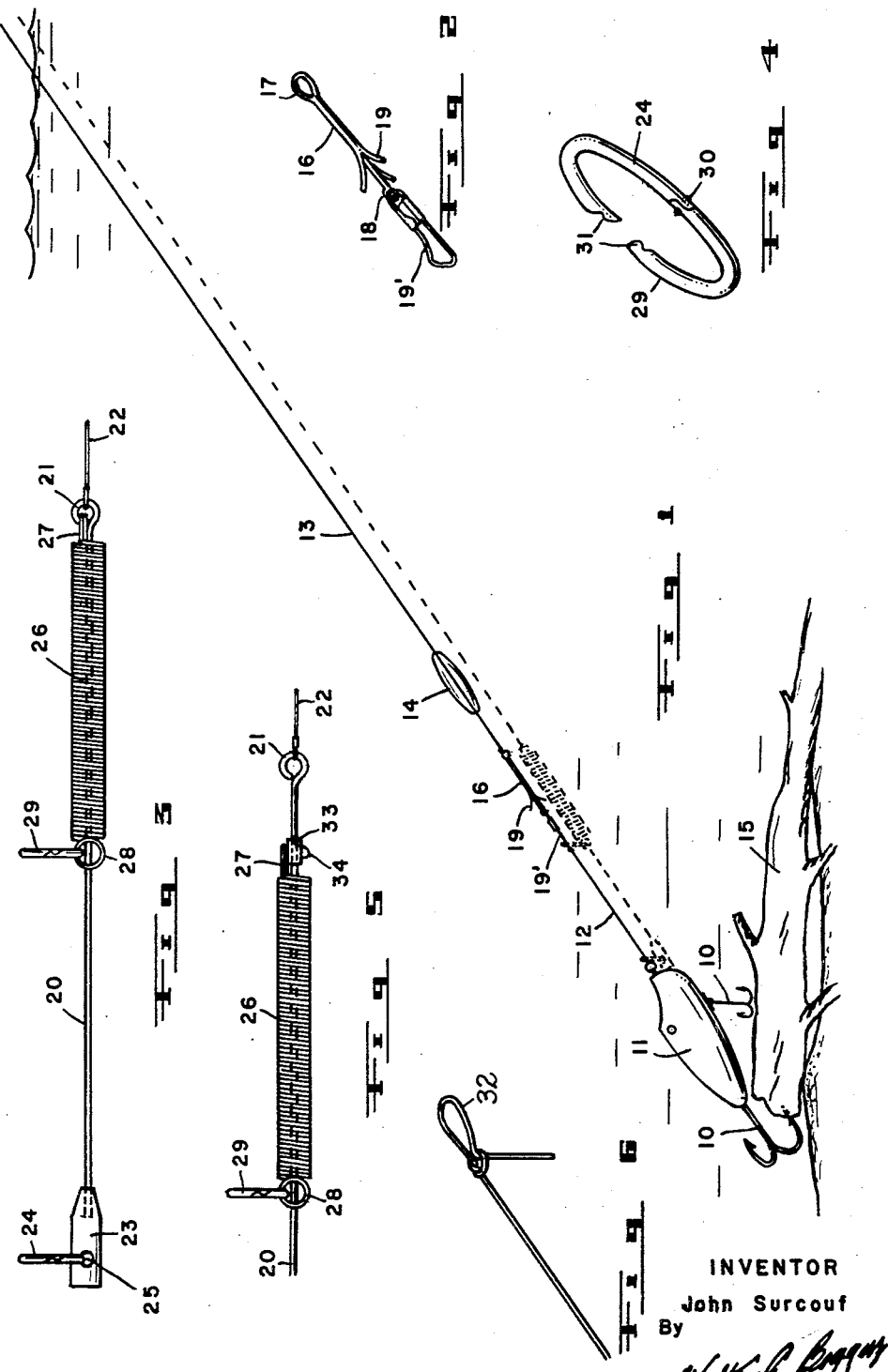

3,010,240
FISHING LINE RETRIEVERS
John Surcouf, 230 Vernon Road, St. James,
Manitoba, Canada
Filed Apr. 6, 1960, Ser. No. 20,429
4 Claims. (Cl. 43—17.2)

In the sport of fishing, the objective is to hook a fish on a relatively light line, play said fish and land same, without breaking the line. In other words; the fish is given a fighting chance to break the line and get away. The hook on the end of the line usually has a wire lead which is extremely strong and a weight is also attached to the line as a sinker therefor. Should the hook, or a lure, catch on an underwater obstruction, such as a rock or sunken tree branch, and a strong pull is made on the line, which is the weakest part, said line will break, and the fisherman will lose the hook or lure, the lead, the weight, and part of the line attached thereto.

The principal object of the present invention is to provide a retrieving device for the above mentioned fishing line, which can be manually operated, with a catch on said line, to release a caught hook, and so save all the above mentioned parts; and should said hook not be releasable, at least the line and weight can be retrieved.

A further object of the invention is to provide a two-piece retrieving device, consisting of an attachment to the fishing line and a mechanism slidable theredown, when the line is caught, said mechanism being operable with said attachment to release the caught hook, or lure.

Further objects of the invention are; to construct said retrieving parts in a simple, economical and durable manner; for simplicity of manufacture and operation, reasonable retail price, and long useful service respectively.

With the above important objects in view, the invention consists essentially in the construction and arrangement of the parts hereinafter more particularly described, reference being had to the accompanying drawings in which:

FIGURE 1 is a side view of a fishing line with a lure caught on a submerged piece of a tree, and the retriever shown in dotted outline.

FIGURE 2 is an enlarged perspective view of a catch attachment for the fishing line.

FIGURE 3 is a side view of the retriever mechanism.

FIGURE 4 is an enlarged perspective of one of the rings for sliding the retriever mechanism down the fishing line.

FIGURE 5 is a side view of a modified construction for the retrieving mechanism.

FIGURE 6 is an enlarged perspective view of a manually made loop, formed in the retriever pulling cable.

In the drawings like characters of reference indicate corresponding parts in the several figures.

The average equipment for sport fishing consists of a hook 10, which may be on a lure 11 having a wire lead 12, and the lead connects to a fishing line having a weight 14 at the lower end for a sinker. The fisherman operates the opposite end of the line. In FIGURE 1, the lure 11 has its rear hook caught on a sunken log 15 and a catch 16 is inserted between the lead 12 and the lower end of the fishing line 13.

The catch 16 (see FIGURE 2) is a special attachment for fishing lines and forms part of the retrieving invention. It consists of a cylindrical-shaped body member having a pair of eyes 17 and 18, one at each end thereof, and three or more fingers 19 angularly protruding therefrom, and terminating around the eye 18. The lower end of the fishing line attaches to the eye 17 and, in the present instance, a standard connector 19', of the safety pin type, is provided to connect eye 18 with the end of the lure lead 12. From the construction shown in FIGURE 2 it will be seen that a ring, such as shown in FIGURE 4, sliding down the fishing line, would also slide over the fingers 19, but would catch therein if pulled back thereup. It will also be observed that the body portion 16 of the catch, above the fingers, could be enlarged into the shape of the weight 14, and be substituted therefor.

The fishing line retriever itself is shown in FIGURE 3 and comprises an elongated wire 20 having an eye 21 at one end thereof, which is connected to a pull cable 22. The opposite end is provided with a weight 23, preferably of lead, which is adapted to be a hammer head for the retriever. A split and hinged ring 24, shown in FIGURE 4, is held to the hammer head by passing through a hole 25 therein. A coil spring 26 is telescoped over one end of the wire 20 and the last two coils at each end thereof are turned at right angles, as indicated at 27 and 28. The coil 27 is caught in the eye 21 of the wire 20 while the coil 28 receives a further split and hinged ring 29. These split rings are quite common, being made from two curved pieces which end-hinge together at 30 while their opposite ends spring-lock together by hooks 31 thereon.

In operation, assuming that the fish hook 10 is caught, the rings 24 and 29 of the retriever are each manually unlocked, attached to the fishing line 13, and re-locked thereon, the ring 24 being the lowest. The retriever is then permitted to slide down the fishing line on these rings, the weight of the hammer head assisting, while the fisherman pays out the cable by hand. In sliding theredown, the rings will pass over the fingers 19 and continue until the hammer head strikes the lure, as shown in dotted outline in FIGURE 1. The fisherman then pulls back on the cable. In this return movement the ring 29 will catch in the fingers 19 of the catch and so anchor the lower end of the spring 26. In the continuing pulling movement the coil spring 26 will stretch, thus building up resilience in the coils, until stopped by the ring 24, moving up with the wire 20, contacting the ring 29. This resistance will be felt on the line by the fisherman. At any time, during or before this cable pulling operation, the fisherman may form a loop in the cable, such as shown at 32 in FIGURE 6. By placing a finger in this loop he can do the pulling therewith, until the above mentioned resistance is felt. By merely tipping his finger, the loop can slide off, and so release the cable. Obviously, when the cable is released, the resilience in the spring 26 will hurl the wire 20 downward like a catapult. The hammer head will strike the lure, or hook, with such a force that it will invariably free same from the caught position. If, for any reason, the hook cannot be freed, the fisherman can draw up on the cable, against the resistance, and so break the lead from the lure, or the lure from the hook, and so save the catch, the weight, and the line.

If for any reason the fisherman wishes to reduce the amount of resilience in the spring, or there is not enough movement permitted on the fishing line for a good hammer action, an adjustment can be made, as shown in FIGURE 5. In this construction, the spring coil 27 is secured to a sleeve 33 slidable on the wire 20. A set screw 34 locks the sleeve to the wire, and it can be released for adjustment.

What I claim as my invention is:

1. In combination with a fishing line having a catch thereon which presents outward angularly extending fingers therearound; a retrieving device for said fishing line, when hook caught, comprising: an elongated member having a pulling cable connected at one end thereof and the opposite end thereof weighted to form a hammer head thereto; a coil spring encircling said member, with one end thereof adjustably secured thereto, adjacent said cable connected end thereof; a split ring carried by the opposite end of said spring; a second split ring carried by the hammer head end of said member; said rings each manually openable for closing attachment onto said fishing line, to slide theredown by gravity, pass over said catch thereon to the caught portion thereof, and with said hammer head leading; said first mentioned ring adapted, when said member is cable pulled back, to hook onto the fingers of said catch and cause resilient extension of said coil spring, in the continued pulling movement; and said member adapted to be hurled down said fishing line for impact against the caught portion thereof by the resiliency of said spring, when said cable is suddenly released.

2. A fishing line retriever, comprising: an elongated member having means at one end thereof for connecting a cable thereto, and the opposite end thereof weighted to provide a hammer head; a resilient member operable over said elongated member, and having one end secured to the cable receiving end thereof; a pair of sliders on said retriever for attachment to, and for sliding of said retriever down, a caught fishing line; one of said sliders carried by the opposite end of the resilient member; the other of said sliders secured to said hammer head to guide same to the caught portion of said line, in said sliding movement of the retriever; and a one-way catch means for insertion in said fishing line, for passage of said sliders thereover in the movement of the retriever down said line, and for catching and holding said one of said sliders, when said retriever is moved back up said line.

3. A fishing line retriever, comprising: an elongated member having means at one end thereof for connecting a cable thereto, and the opposite end thereof weighted to provide a hammer head; a sleeve slidably mounted on the cable connecting end of said elongated member; means for securing said sleeve in adjusted position on said elongated member; a resilient member slidably telescoped over said elongated member, with one end secured to said sleeve; a pair of sliders on said retriever for attachment to, and for sliding of said retriever down, a caught fishing line; one of said sliders carried by the opposite end of said resilient member; the other of said sliders secured to said hammer head to guide same down the fishing line to the caught portion thereof, in said retriever sliding movement; catch means for insertion in said fishing line for passage of said sliders thereover in said retriever sliding movement theredown, and for catching and holding said sliders, when said retriever is moved back up said line; and said sleeve manually movable to adjusted positions on said elongated member for altering the distance between said resilient member and said other of said sliders to vary the amount of tension in said latter member, when said sliders are both caught by said catch.

4. In combination with a caught fishing line; a retriever therefor, comprising: a catch on said fishing line, near the caught end thereof; an elongated member; a cable connected to one end of said member, and the opposite end thereof weighted to form a hammer head; a resilient member telescopically mounted over the elongated member, and with one end secured thereto, adjacent said cable connected end thereof; a slider on the opposite end of the resilient member; a second slider carried by said hammer head; said sliders manually attachable to said fishing line for sliding movement of retriever theredown, over said catch, to the caught portion of said line; said first mentioned slider adapted to be caught by said catch, when the retriever is manually pulled backward on the line by said cable, and cause tension build-up in the resilient member, in the continued pull on same; and said elongated member adapted to be hurled down said fishing line by said built-up tension and guided by said second mentioned slider into impact with the caught portion of said line, when said cable is suddenly released.

References Cited in the file of this patent
UNITED STATES PATENTS

| | | |
|---|---|---|
| 2,607,149 | Cox | Aug. 19, 1952 |
| 2,764,833 | Clark | Oct. 2, 1956 |